United States Patent [19]

Peterson et al.

[11] Patent Number: 5,562,751
[45] Date of Patent: Oct. 8, 1996

[54] I.S. MACHINE

[75] Inventors: George T. Peterson, Bristol; John W. McDevitt, Vernon; Timothy J. Liska, W. Simsbury, all of Conn.

[73] Assignee: Emhart Glass Machinery Investments Inc., Wilmington, Del.

[21] Appl. No.: 250,206

[22] Filed: May 27, 1994

[51] Int. Cl.⁶ .................................................. C03B 7/00
[52] U.S. Cl. ......................... 65/164; 65/29.1; 65/29.11; 65/158; 65/DIG. 13
[58] Field of Search ................................ 65/29.1, 29.11, 65/158, 164, DIG. 13; 364/473; 356/73.1

[56] References Cited

U.S. PATENT DOCUMENTS

| | | | |
|---|---|---|---|
| 4,145,204 | 3/1979 | Farkas et al. | 65/164 |
| 4,145,205 | 3/1979 | Farkas et al. | 65/164 |
| 4,382,810 | 5/1983 | Wood | 65/29 |
| 4,723,980 | 2/1988 | Sidler et al. | 65/163 |

FOREIGN PATENT DOCUMENTS 2175415  11/1986  United Kingdom.

*Primary Examiner*—Donald E. Czaja
*Assistant Examiner*—Sean Vincent
*Attorney, Agent, or Firm*—Spencer Smith

[57] ABSTRACT

An I.S. machine system has a number of mechanisms which are driven by an inverter drive and a number of machine and section mechanisms which are driven by profiled motion actuators which are controlled by repetitive sequencers associated with each actuator. These repetitive sequencers are synchronized by taking the reference signal from a master clock which supplies the reference signal to the inverters and converts it to a once/cut sync signal for the machine mechanisms operated by profiled motion actuators and to a once/cycle sync signal for the section mechanisms and controllers.

10 Claims, 1 Drawing Sheet

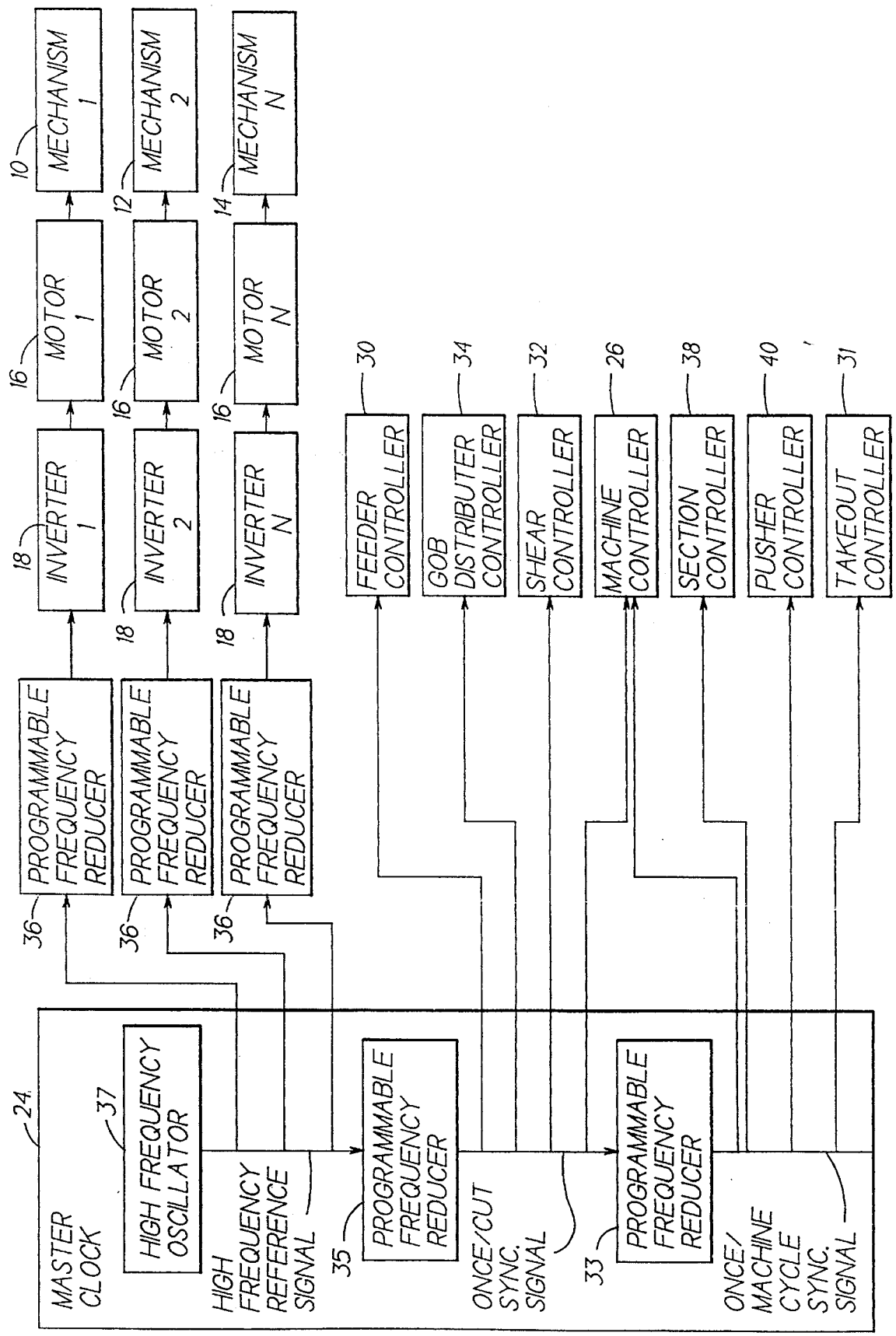

I.S. MACHINE

The present invention relates to an I.S. (Individual Section) machine system for manufacturing glass containers. In such systems a feeder continuously produces one or more runners of molten glass which are shaped by the action of one or more plungers which are displaceable to control the flow of the molten glass from openings in an orifice plate at the bottom of the feeder. A shaped runner is cut by a shear mechanism to define a discrete gob and the gob is delivered by a gob distributor to one of the machine sections where it is formed into a container. A formed container is deposited on a dead plate where it momentarily cools. The cooled container is then pushed onto a machine conveyor by a pusher mechanism. Containers carried by the machine conveyor are transferred to a cross conveyor by a ware transfer mechanism.

Some of these mechanisms and the controllers for the machine and for the sections include repetitive sequencers which must be synchronized. Synchronization of the repetitive sequencer is conventionally achieved by generating a once per cut signal from a proximity probe secured to a mechanical element which cycles 360° each machine cut. For example, it is common for a proximity probe to be part of the feeder which shapes the gobs. These prior art systems have an accuracy of about ±two milliseconds and since they are part of mechanically displaceable structure, accuracy degrades with wear. U.S. Pat. No. 5,271,756 discloses such a system.

It is an object of the present invention to provide a synchronization system that will have a much higher accuracy.

Referring to the drawings:

The sole FIGURE is a block diagram illustrating the synchronization design for an I.S. machine system made in accordance with the teachings of the present invention.

An I.S. machine has one or more mechanisms 10, 12, 14 which may be driven by constant speed motors 16 such as synchronous motors. Such mechanisms may include a machine conveyor, a cross conveyor and a ware transfer mechanism, for example. Each motor 16 is driven by an inverter drive 18 which receives a frequency defined by a programmable frequency reducer 36 which receives a high frequency reference signal from a high frequency oscillator 37 of a master clock 24. The high frequency reference signal is also supplied to another programmable frequency reducer 35 which defines a once/cut sync signal (the programmable frequency reducer 35 converts the high frequency reference signal to a once/cut sync signal). The reference signal, which can have an accuracy of ±5 microseconds (a 1000 fold improvement over conventional once per cut signals), will never degrade in accuracy.

The once/cut sync signal, which could be supplied to the interface part of the machine controller 26 transition board, directly supplies machine mechanisms (feeder 30, shear 32 and gob distributor 34) each of which includes a profiled motion actuator such as a servo controlled by a repetitive sequencer. The repetitive sequencer can accordingly be thereby synchronized. The once/cut sync signal is also supplied to a third programmable frequency reducer 33 which can also be located in the interface part of the machine controller transition board. This programmable frequency reducer 33 divides the once/cut sync signal by the number of running sections to generate a once/cycle sync signal (the programmable frequency reducer 33 converts the once/cut sync signal to a once/cycle sync signal) which synchronizes the repetitive sequencer (not shown) of section controllers 38 and pusher controllers 40 and take out controllers 31, etc. associated with each section.

Both the once/cut sync signal and the once/cycle sync signal are supplied to the Machine Controller 26 which supervises the individual section controllers and has functions which are performed both once per cut and once per cycle (the Machine Controller has a repetitive sequencer synchronized with a once/cut sync signal and a repetitive sequencer synchronized with a once/cycle sync signal).

In a tandem machine configuration a single machine controller can supervise both machines and the interface part of the machine controller transition board can supply once/cut or once/cycle sync signals to all of the machine and section mechanisms. The offset of the phase of an inverter controlled constant speed motor of either machine may be carried out by the machine controller. Servo mechanisms or section controllers associated with either machine will be offset from the sync by a parameter passed to them via data base communications.

We claim:

1. A machine for forming glass containers from discrete gobs repetitively cut from a runner of molten glass comprising at least one controller having a repetitive sequencer synchronized with a once/cut sync signal, at least one controller having a repetitive sequencer synchronized with a once/cycle sync signal, a high frequency source which produces a reference signal, means for converting said reference signal to a once/cut sync signal, delivery means for delivering said once/cut sync signal to said at least one controller having said repetitive sequencer synchronized with a once/cut sync signal for synchronizing said repetitive sequencer, means for converting said once/cut sync signal to a once/cycle sync signal and for delivering said once/cycle sync signal to said at least one controller having said repetitive sequencer synchronized with a once/cycle sync signal for synchronizing said repetitive sequencer.

2. A machine according to claim 1, further comprising at least one controller having a first repetitive sequencer synchronized with a once/cut sync signal and a second repetitive sequencer synchronized with a once/cycle sync signal.

3. A manufacturing system according to claim 1, wherein said at least one controller having a repetitive sequencer synchronized with a once/cut sync signal comprises a gob distributor controller.

4. A manufacturing system according to claim 3, wherein said at least one controller having a repetitive sequencer synchronized with a once/cut sync signal further comprises a shear controller.

5. A manufacturing system according to claim 4, wherein said at least one controller having a repetitive sequencer synchronized with a once/cut sync signal further comprises a feeder controller.

6. A manufacturing system according to claim 1, wherein said at least one controller having a repetitive sequencer synchronized with a once/cycle sync signal comprises a pusher controller.

7. A manufacturing system according to claim 6, wherein said at least one controller having a repetitive sequencer synchronized with a once/cycle sync signal further comprises a section controller.

8. A manufacturing system according to claim 7, wherein said at least one controller having a repetitive sequencer synchronized with a once/cycle sync signal further comprises a takeout controller.

9. A machine according to claim 1, wherein there is a plurality of controllers having a repetitive sequencer synchronized with a once per cut sync signal.

10. A machine according to claim 9, wherein there is a plurality of controllers having a repetitive sequencer synchronized with a once per cycle sync signal.

* * * * *